United States Patent
Salgado et al.

(10) Patent No.: US 8,964,212 B2
(45) Date of Patent: Feb. 24, 2015

(54) APPARATUS AND METHOD FOR DISALLOWING DEVICES FOR PRINT DRIVER PRINTING

(75) Inventors: David Salgado, Victor, NY (US); Kathren A. Korsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 936 days.

(21) Appl. No.: 12/770,154

(22) Filed: Apr. 29, 2010

(65) Prior Publication Data

US 2011/0267642 A1 Nov. 3, 2011

(51) Int. Cl.
*G06F 3/12* (2006.01)

(52) U.S. Cl.
CPC .............. *G06F 3/126* (2013.01); *G06F 3/1204* (2013.01); *G06F 3/1255* (2013.01); *G06F 3/1285* (2013.01)
USPC .......... 358/1.15; 358/1.9; 358/1.14; 358/1.16

(58) Field of Classification Search
USPC ................................................. 358/1.1–3.29
See application file for complete search history.

(56) References Cited

U.S. PATENT DOCUMENTS

| | | | |
|---|---|---|---|
| 2002/0143773 A1* | 10/2002 | Spicer et al. ..................... | 707/10 |
| 2003/0231328 A1* | 12/2003 | Chapin et al. ................ | 358/1.13 |
| 2004/0008366 A1* | 1/2004 | Ferlitsch ....................... | 358/1.15 |
| 2005/0203805 A1 | 9/2005 | Clough et al. | |
| 2007/0052994 A1 | 3/2007 | Gullett et al. | |
| 2007/0234354 A1* | 10/2007 | Hattori .......................... | 717/177 |
| 2008/0180726 A1* | 7/2008 | Selvaraj ........................ | 358/1.15 |
| 2009/0088183 A1* | 4/2009 | Piersol et al. ............... | 455/456.1 |
| 2009/0273808 A1* | 11/2009 | Kohli et al. .................. | 358/1.15 |

OTHER PUBLICATIONS

Xerox; Xerox Print Driver; http://www.office.xerox.com/software-solutions/mobile-printer-driver/enus.html; Apr. 23, 2010.
Kathren Korsky, Richie Michelon, Greg L. Schmidt, Doug Tallinger of Xerox; Xerox Print Driver Platform; pp. 1-22; Jun. 2009.

* cited by examiner

*Primary Examiner* — Marcellus Augustin
(74) *Attorney, Agent, or Firm* — Ronald E. Prass, Jr.; Prass LLP

(57) ABSTRACT

An apparatus and method for disallowing devices for print driver printing are disclosed. The method can be in an electronic device including a network connection. The method can include providing a multiple printing device print driver installed on the electronic device where the multiple printing device print driver is a single print driver that provides print access to multiple printing devices for the electronic device. The method can include receiving printing device accessibility rules, where the printing device accessibility rules provide rules for determining which printing devices the electronic device is allowed to print to using the multiple printing device print driver. The method can include discovering printing devices proximal to the electronic device using the network connection and using the multiple printing device print driver to generate discovered printing devices. The method can include filtering the discovered printing devices using the multiple printing device print driver based on the printing device accessibility rules to generate at least one filtered discovered printing device that satisfies the printing device accessibility rules. The method can include displaying the at least one filtered discovered printing device on the electronic device.

9 Claims, 3 Drawing Sheets

APPARATUS AND METHOD FOR DISALLOWING DEVICES FOR PRINT DRIVER PRINTING

BACKGROUND

Disclosed herein are a method and apparatus for disallowing devices for print driver printing.

Presently, image forming devices such as printers, copiers and multi-function devices provide users the ability to print from user devices such as desktop or laptop computers, handheld computers, or other electronic devices, to a printer connected to the device. The electronic devices may be stand alone devices, or may be connected over a network, such as in a business, campus, or personal computing environment, that includes one or more printers.

In order for a printer to interface with and function with the user device to which it is connected, a printer driver can typically be installed on the user device. A printer driver is software which controls the printer from the user device. The printer driver may include a user interface which may be typically accessed by a user through an operating system or an application program, such as a word processing program, a spreadsheet program, or other types of programs, and viewed on a display.

Users of user devices in a network have access to all of the printers on the network. Unfortunately, users send print jobs to printers that are not appropriate for their print job. For example, a user in an accounting department may send a spreadsheet print job to a glossy paper color printer in a graphics department, where a standard paper black and white printer would be more appropriate and would not waste unnecessary resources. Therefore, system administrators want to prohibit select users from printing to specific devices to provide efficient workflow and appropriate resource usage. Thus, there is a need for an apparatus and method for disallowing devices for print driver printing.

SUMMARY

An apparatus and method for disallowing devices for print driver printing are disclosed. The method can be in an electronic device including a network connection. The method can include providing a multiple printing device print driver installed on the electronic device where the multiple printing device print driver is a single print driver that provides print access to multiple printing devices for the electronic device. The method can include receiving printing device accessibility rules, where the printing device accessibility rules provide rules for determining which printing devices the electronic device is allowed to print to using the multiple printing device print driver. The method can include discovering printing devices proximal to the electronic device using the network connection and using the multiple printing device print driver to generate discovered printing devices. The method can include filtering the discovered printing devices using the multiple printing device print driver based on the printing device accessibility rules to generate at least one filtered discovered printing device that satisfies the printing device accessibility rules. The method can include displaying the at least one filtered discovered printing device on the electronic device.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

Figure 1:
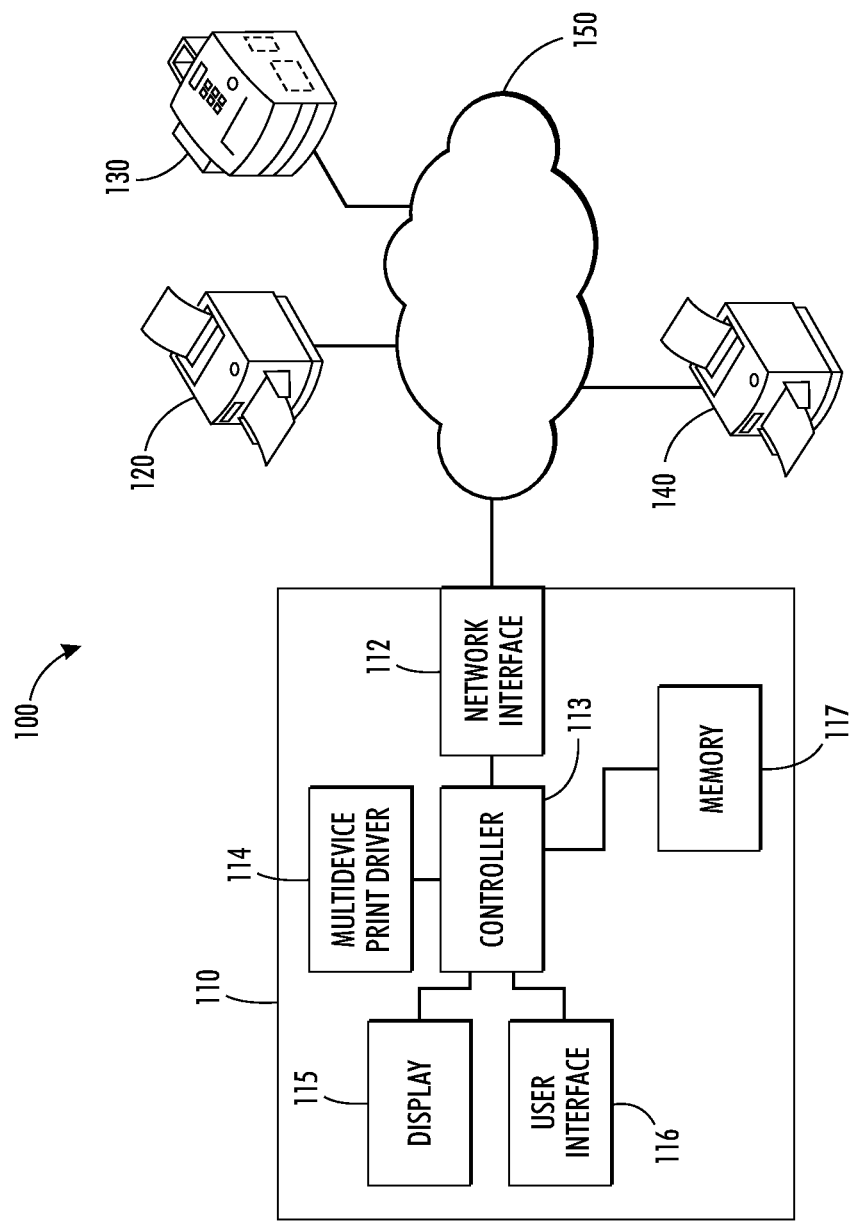
FIG. 1 is an exemplary illustration of a system.

The embodiments include a method for disallowing devices for print driver printing. The method can be performed in an electronic device including a network connection. The method can include providing a multiple printing device print driver installed on the electronic device where the multiple printing device print driver is a single print driver that provides print access to multiple printing devices for the electronic device. The method can include receiving printing device accessibility rules, where the printing device accessibility rules provide rules for determining which printing devices the electronic device is allowed to print to using the multiple printing device print driver. The method can include discovering printing devices proximal to the electronic device using the network connection and using the multiple printing device print driver to generate discovered printing devices. The method can include filtering the discovered printing devices using the multiple printing device print driver based on the printing device accessibility rules to generate at least one filtered discovered printing device that satisfies the printing device accessibility rules. The method can include displaying the at least one filtered discovered printing device on the electronic device.

The embodiments further include an apparatus that disallows devices for print driver printing. The apparatus can include a network connection configured to connect the apparatus to a network. The apparatus can include a controller configured to control operations of the apparatus and configured to communicate over the network connection. The apparatus can include a memory coupled to the controller. The apparatus can include a multiple printing device print driver installed on the apparatus where the multiple printing device print driver is a single print driver that provides print access to multiple printing devices for the apparatus. The apparatus can include printing device accessibility rules stored in the memory, where the printing device accessibility rules can provide rules for determining which printing devices the apparatus is allowed to print to using the multiple printing device print driver. The multiple printing device print driver can be configured to discover printing devices proximal to the apparatus using the network connection and using the multiple printing device print driver to generate discovered printing devices and can be configured to filter the discovered printing devices based on the printing device accessibility rules to generate at least one filtered discovered printing device that satisfies the printing device accessibility rules. The apparatus can include a display configured to display the at least one filtered discovered printing device.

The embodiments further include a computer readable medium including a multiple printing device print driver that disallows devices for print driver printing. The computer readable medium can include a computer-usable data carrier storing a multiple printing device print driver, the multiple printing device print driver, when executed by a controller, causing the controller to control an electronic device by providing print access to multiple printing devices for the electronic device. The multiple printing device print driver can also control the electronic device by receiving printing device accessibility rules, where the printing device accessibility rules provide rules for determining which printing devices the electronic device is allowed to print to using the multiple printing device print driver. The multiple printing device print driver can also control the electronic device by discovering printing devices proximal to the electronic device to generate discovered printing devices. The multiple printing device print driver can also control the electronic device by filtering the discovered printing devices based on the printing device accessibility rules to generate at least one filtered discovered printing device that satisfies the printing device accessibility rules. The multiple printing device print driver can also control the electronic device by sending instructions to display the at least one filtered discovered printing device on the electronic device.

FIG. 1 is an exemplary illustration of a system 100. The system 100 can include printing devices 120, 130, and 140, at least one user terminal 110 and at least one network 150. The printing devices 120, 130, and/or 140 may be printers, multifunction media devices, xerographic machines, ink jet printers, or any other devices that generate an image on media. The terminal 110 can be a portable electronic device, a laptop computer, a mobile phone, a personal digital assistant, or any other electronic device.

The terminal 110 can include a network interface 112, such as a network connection, configured to connect the terminal 110 to a network and configured to communicate with at least one printing device, such as the printing devices 120, 130, and/or 140, over the network 150. The network interface 112 can be an Ethernet network connection, a universal serial bus connection, an 802.11-based wireless connection, a WiFi connection, a local area network connection, such as a wireless local area network connection, a cellular connection, or any connection that can connect an electronic device to a network.

The terminal 110 can include a controller 113 coupled to the network interface 112. The controller 113 can be configured to control operations of the terminal 110 and can be configured to communicate over the network interface 112. The terminal 110 can include a memory 117 coupled to the controller 113. The memory 117 may include a random access memory, a read only memory, an optical memory, a hard drive, a thumb drive, a floppy disk, a compact disk, or any other memory that can be used with an electronic device.

The terminal 110 can include a multiple printing device print driver 114 installed on the terminal 110. The multiple printing device print driver 114 can be coupled to the controller 113, can reside within the controller 113, can reside within the memory 117, can be an autonomous module, can be software, can be hardware, or can be in any other format useful for a print driver on an electronic device.

The multiple printing device print driver 114 can be a single print driver that provides print access to multiple printing devices for the terminal 110. Other print drivers may also be installed on the terminal 110 along with a single print driver that provides access to multiple printing devices. The multiple printing device print driver 114 can be configured to discover multiple printing devices within a given location and can be configured to make at least one printing device of the multiple printing devices available to the terminal 110 for printing. The multiple printing device print driver 114 can also be configured to determine no discovered printing devices satisfy printing device accessibility rules. The multiple printing device print driver 114 can also be configured to determine the terminal 110 is not allowed to access a currently selected printing device and can be configured discover printing devices proximal to the terminal 110 to generate discovered printing devices in response to determining the terminal 110 is not allowed to access a currently selected printing device.

The multiple printing device print driver 114 can be a universal print driver or a mobile print driver. For a universal print driver, such as a global print driver, a user can specify an IP address for a printing device when installing the universal print driver using an add printer wizard, but access can be restricted from the printing device at print time based on printing device accessibility rules. If a different installer is used, the access can be restricted at installation using the printing device accessibility rules, such as when discovering printing devices using the multiple printing device print driver. For example, a universal or global print driver can perform discovery and can choose a printing device when the universal print driver installed. A user can modify a selected port for a printing device to change which printing device is selected. A mobile print driver can perform discovery and can present a choice of printing devices at print time. Thus, a mobile print driver can dynamically select a chosen device at print time.

A print driver can be part of an operating system workflow that is used by an end user. It can take an application document and convert it into a page description language. To elaborate, a print driver can convert a document into a printing device readable page description language, such as a postscript language. A print manager can receive the device readable page description language of the document and can provide it to a printing device. For example, a printer driver or a print processor can be a piece of software that converts the data to be printed to the form specific to a printer. A multiple printing device print driver can have a one-to-many relationship with multiple printing devices as opposed to previous print drivers that had a one-to-one relationship with a single printing device.

The terminal 110 can include printing device accessibility rules stored in the memory 117 or otherwise associated with the multiple printing device print driver 114. The printing device accessibility rules can provide rules for determining which printing devices the terminal 110 is allowed to print to using the multiple printing device print driver 114. The multiple printing device print driver 114 can be configured to discover printing devices proximal to the terminal 110 to generate discovered printing devices and can be configured to filter the discovered printing devices based on the printing device accessibility rules to generate at least one filtered discovered printing device that satisfies the printing device accessibility rules. The device accessibility rules can restrict access to printing devices that the terminal 110 is not allowed to print to.

The terminal 110 can include a display 115 coupled to the controller 113. The display 115 can be a liquid crystal display (LCD), a light emitting diode (LED) display, a plasma display, a cathode ray tube display, a touch screen display, or any other means for displaying information. The display 115 can be configured to display the at least one filtered discovered printing device. The display 115 can also be configured to display a message indicating no discovered printing devices satisfy the printing device accessibility rules in response to the multiple printing device print driver 114 determining no discovered printing devices satisfy the printing device accessibility rules.

The terminal 110 can include a user interface 116 coupled to the controller 113. The user interface 116 can include a keypad, buttons, a touch pad, a joystick, an additional display, a touch screen, or any other device useful for providing an interface between a user and an electronic device. The user interface 116 can be configured to receive a print command instructing the controller 113 to perform a print function. The multiple printing device print driver 114 can be configured to discover printing devices proximal to the terminal 110 in response to receiving the print command. The multiple printing device print driver 114 also can be configured to identify that the terminal 110 has connected to a new network location different from a network location of a previous discovery of printing devices and can be configured to discover printing devices proximal to the terminal 110 in response to receiving the print command and in response to identifying the terminal 110 has connected to a new network location.

The memory 117 can be a computer-readable medium. The computer-readable medium can be a computer-usable data carrier storing a multiple printing device print driver. The multiple printing device print driver, when executed by the controller 113, can cause the controller 113 to control the terminal 110 by providing print access to multiple printing devices for the terminal 110.

The multiple printing device print driver can also control the terminal 110 by receiving printing device accessibility rules, where the printing device accessibility rules provide rules for determining which printing devices the terminal 110 is allowed to print to using the multiple printing device print driver. The device accessibility rules can also restrict access to printing devices that the terminal 110 is not allowed to print to. The multiple printing device print driver can also control the terminal 110 by discovering printing devices proximal to the terminal 110 to generate discovered printing devices. Discovering printing devices proximal to the terminal 110 can be performed in response to receiving a print command at the terminal 110. The multiple printing device print driver can also control the terminal 110 by filtering the discovered printing devices using the multiple printing device print driver based on the printing device accessibility rules to generate at least one filtered discovered printing device that satisfies the printing device accessibility rules. The multiple printing device print driver can also control the terminal 110 by sending multiple printing device print driver to display the at least one filtered discovered printing device on the terminal 110. The multiple printing device print driver can also control the terminal 110 by determining no discovered printing devices satisfy the printing device accessibility rules. The multiple printing device print driver can also control the terminal 110 by displaying a message indicating no discovered printing devices satisfy the printing device accessibility rules in response to determining no discovered printing devices satisfy the printing device accessibility rules.

According to some embodiments, a system administrator can specify, in the multiple printing device print driver 114, a set of device accessibility rules that determine what printing devices a user can print to. For example, the system administrator can specify these rules in a mobile express print driver and the mobile express print driver can apply them when it presents the list of discovered printing devices to the user. The system administrator can thus manage what printing devices a user can print to from a mobile print driver.

A user, such as a system administrator or other user, can specify in the multiple printing device print driver 114 which printing devices are and/or are not accessible for printing. The user can specify the filtering rule in a number of ways: 1) by manufacturer, 2) by product family, 3) by individual model, 4) by printing device IP address, 5) by speed range, and 6) by device capability, such as color printing, or by other useful criteria for filtering printing devices. The user may specify an unlimited number of printing device access rules.

The multiple printing device print driver 114 can provide a simple user interface for adding or removing device access rules. When a user of the terminal 110 selects to print using the multiple printing device print driver 114, the multiple printing device print driver 114 can perform its normal discovery of devices in the terminal user's current location. It can then filter the list of discovered printers based on its device access rules and may only present discovered printing devices that meet these rules to the terminal user. If no allowable printing devices are discovered, the terminal user can be notified to contact the location's system administrator to acquire access to a local printing device.

The system administrator or other user can also pre-configure the multiple printing device print driver 114 with a set of allowable devices. With a pre-configured print driver, the end user of the terminal 110 may not have the ability to modify the device access list. Also, when a print driver already points to a printing device and does not perform a device discovery operation during a print request, the print driver can confirm that it is allowed to print to the printing device it is pointed to based on the device access rules. If it is not allowed to print to the currently selected printing device, the print driver can execute a device discovery for allowable printing devices and can present this list to the end user. The end user can then select the desired printing device and the print driver can automatically modify its configuration to point to the newly selected printing device.

Some embodiments can provide a mechanism for a system administrator to prevent their users from printing to devices that the users do not have access to. A third party software component, such as a print manager, is not required and the system administrator does not have to modify all printing devices with access information. For example, if a system administrator wants its accounting department users to only print to Xerox devices in the 30-50 ppm range, the system administrator can configure the multiple printing device print driver 114 with two device access rules:

1) manufacturer=Xerox, and
2) device speed>=30 and device speed<=50

Figure 2:
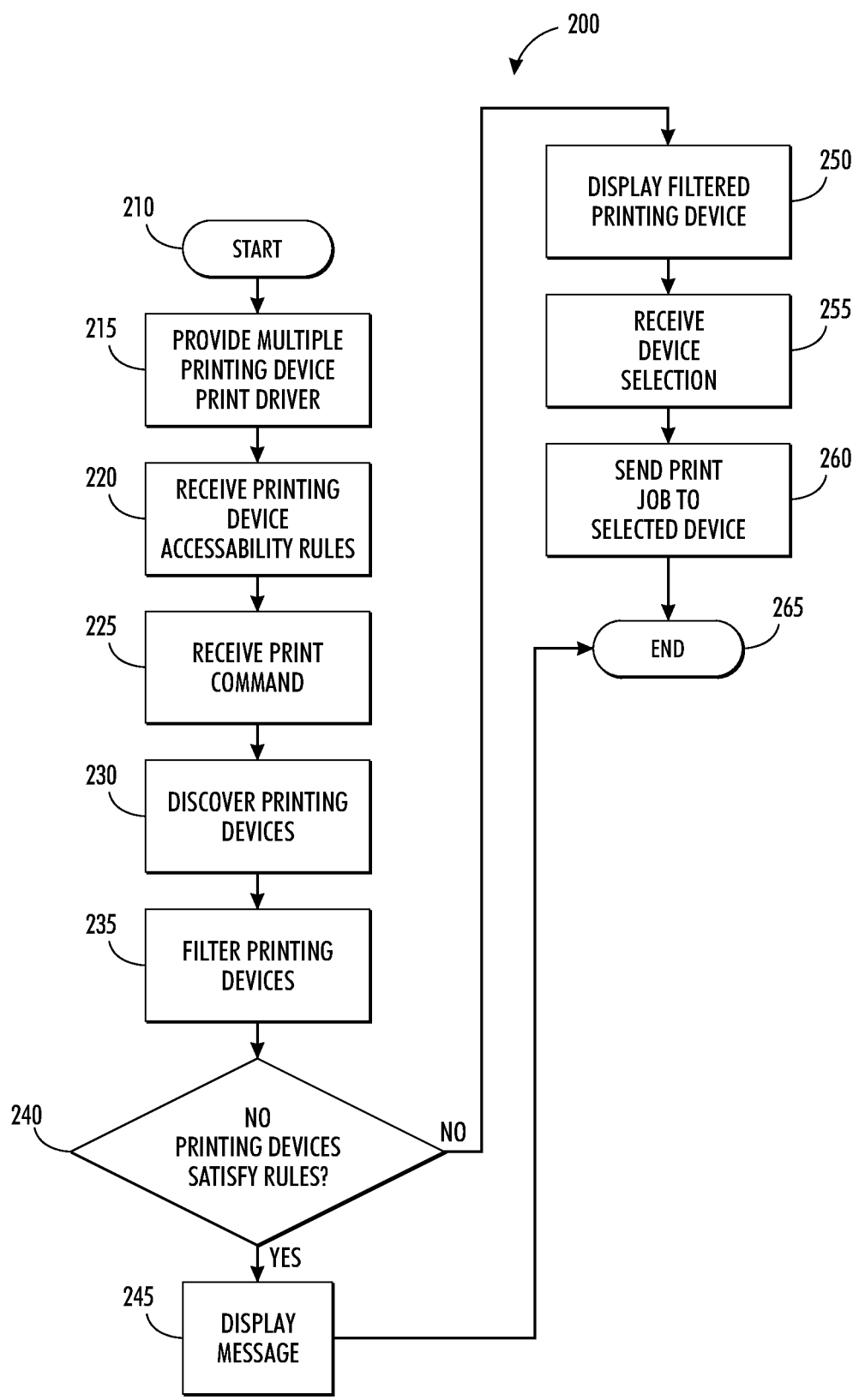
FIG. 2 illustrates an exemplary flowchart.

FIG. 2 illustrates an exemplary flowchart 200 of a method of disallowing devices for print driver printing for an electronic device, such as the terminal 110, including a network connection. The method starts at 210. At 215, a multiple printing device print driver can be installed on the electronic device. The multiple printing device print driver can be a single print driver that provides print access to multiple printing devices for the electronic device. The multiple printing device print driver can be configured to discover multiple printing devices within a given location and can be configured to make at least one printing device of the multiple printing devices available to the electronic device for printing. The multiple printing device print driver can be a mobile print driver that provides print access to multiple printing devices for a portable electronic device.

At 220, printing device accessibility rules can be received. The printing device accessibility rules can provide rules for determining which printing devices the electronic device is allowed to print to using the multiple printing device print driver. The printing device accessibility rules can restrict access to printing devices that the electronic device is not allowed to print to. The printing device accessibility rules can provide rules for determining which printing devices the electronic device is allowed to print to based on one or more of the following: printing device manufacturer, printing device model, printing device Internet Protocol address, printing device speed, printing device capabilities, and/or other information that can be useful for determining which printing devices an electronic device is allowed to print to.

At 225, a print command can be received at the electronic device. When the print command is received, the multiple printing device print driver can determine whether the electronic device has connected to a new network location different from a network location of a previous discovery of printing devices. The multiple printing device print driver can also determine whether the electronic device is not allowed to access a currently selected printing device.

At 230, printing devices proximal to the electronic device can be discovered using the multiple printing device print driver to generate discovered printing devices. Printing devices proximal to the electronic device can be discovered in response to receiving the print command. Printing devices proximal to the electronic device can also be discovered in response to determining the electronic device has connected to a new network location. Printing devices proximal to the electronic device can also be discovered using the multiple printing device print driver to generate discovered printing devices in response to determining the electronic device is not allowed to access a currently selected printing device.

At 235, the discovered printing devices can be filtered using the multiple printing device print driver based on the printing device accessibility rules to generate at least one filtered discovered printing device that satisfies the printing device accessibility rules. At 240, whether no discovered printing devices satisfy the printing device accessibility rules can be determined. At 245, a message indicating no discovered printing devices satisfy the printing device accessibility rules can be displayed in response to determining no discovered printing devices satisfy the printing device accessibility rules.

At 250, the at least one filtered discovered printing device can be displayed on the electronic device. At 255, a printing device selection can be received. At 260, a print job can be sent to the selected printing device. At 265, the method can end.

According to some embodiments, all of the blocks of the flowchart 200 are not necessary. Additionally, the flowchart 200 or blocks of the flowchart 200 may be performed numerous times, such as iteratively. For example, the flowchart 200 may loop back from later blocks to earlier blocks. Furthermore, many of the blocks can be performed concurrently or in parallel processes.

Figure 3:
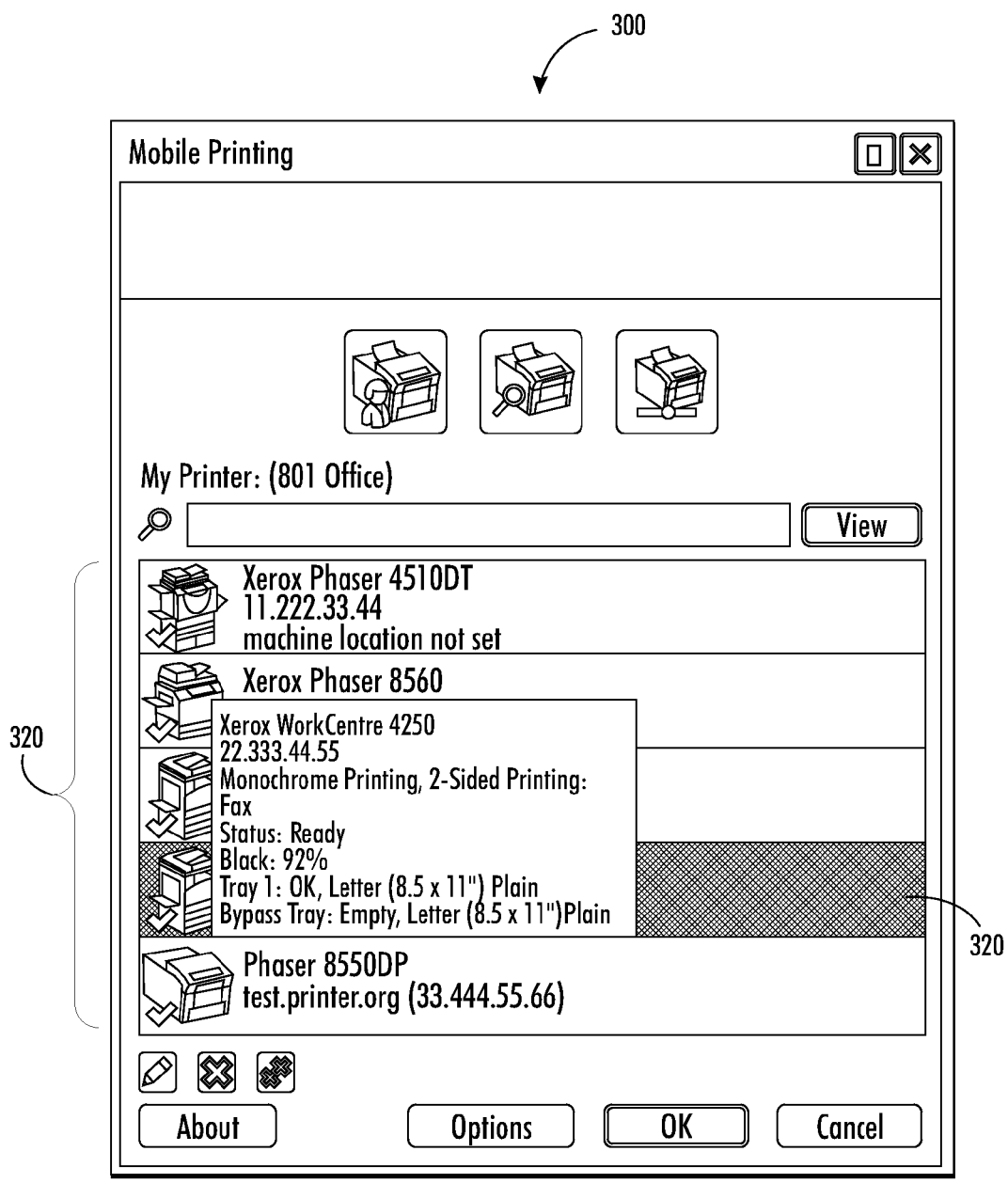
FIG. 3 is an exemplary illustration of a display.

FIG. 3 is an exemplary illustration of a display 300. At least one filtered discovered printing device 320 can be displayed on display of an electronic device, such as on the display 115 of the terminal 110. A user can select a desired printing device 320 from the at least one filtered discovered printing device 320 for printing a print job.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method for controlling printing in an electronic device including a network connection, the method comprising:
   providing a multiple printing device print driver installed on the electronic device, the multiple printing device print driver being a single print driver that provides print access to a plurality of printing devices for the electronic device;
   automatically recovering printing device accessibility rules with a processor from a memory in which the printing device accessibility rules are stored, the printing device accessibility rules providing rules for determining which of the plurality of printing devices the electronic device is allowed to print to using the multiple printing device print driver;
   discovering, with the processor, one or more of the plurality of printing devices proximal to the electronic device using the network connection and using the multiple printing device print driver to generate a list of the discovered one or more of the plurality of printing devices;
   filtering, with the processor, the list of the discovered one or more of the plurality of printing devices using the multiple printing device print driver based on the automatically recovered printing device accessibility rules to specify at least one filtered discovered printing device that satisfies the automatically recovered printing device accessibility rules;

displaying the at least one filtered discovered printing device on the electronic device, the automatically recovered printing device accessibility rules restricting access to at least one of the plurality of printing devices to which the electronic device is not allowed to print;

receiving a print command at the electronic device; and determining whether the electronic device is connected to a second network location different from a first network location of a previous discovering of the one or more of the plurality of the printing devices, wherein the discovering of the printing devices proximal to the electronic device is performed in response to receiving the print command and according to the determining that the electronic device is connected to the second network location.

2. The method according to claim 1, further comprising:
receiving a print command at the electronic device,
the discovering of the one or more of the plurality of the printing devices proximal to the electronic device being performed only in response to the receiving the print command.

3. The method according to claim 1, the printing device accessibility rules providing rules for determining which of the plurality of printing devices the electronic device is allowed to print to based on one or more of printing device manufacturer, printing device model, printing device Internet Protocol address, printing device speed, and other printing device capabilities.

4. The method according to claim 1, further comprising:
determining that none of the discovered printing devices satisfy the automatically recovered printing device accessibility rules; and
displaying a message on the electronic device indicating that the none of the discovered one or more of the plurality of the printing devices satisfy the automatically recovered printing device accessibility rules in response to the determining.

5. An apparatus for controlling printing, comprising:
a network connection configured to connect the apparatus to a network;
a controller configured to control operations of the apparatus and to communicate over the network connection;
a memory coupled to the controller;
a multiple printing device print driver installed on the apparatus, the multiple printing device print driver being a single print driver that provides print access to multiple printing devices for the apparatus;
printing device accessibility rules previously stored in the memory, the printing device accessibility rules providing rules for determining which printing devices the apparatus is allowed to print to using the multiple printing device print driver, the multiple printing device print driver being configured to discover one or more of a plurality of printing devices proximal to the apparatus, using the network connection, to generate a list of discovered printing devices and to filter the list of discovered one or more of the plurality of the printing devices based on the printing device accessibility rules as automatically recovered from the memory to specify at least one filtered discovered printing device that satisfies the printing device accessibility rules;
a display configured to display the at least one filtered discovered printing device,
the device accessibility rules restricting access to printing devices to which the apparatus is not allowed to print; and
a user interface configured to receive a print command instructing the controller to perform a print function, the multiple printing device print driver being configured to identify that the apparatus is connected to a second network location different from a first network location of a previous discovering of the one or more of the plurality of the printing devices and to discover printing devices proximal to the apparatus in response to receiving the print command and according to the identifying the apparatus being connected to the second network location.

6. The apparatus according to claim 5, further comprising a user interface configured to receive a print command instructing the controller to perform a print function,
the multiple printing device print driver being configured to discover the one or more of the plurality of printing devices proximal to the apparatus only in response to the receiving the print command.

7. The apparatus according to claim 5, the multiple printing device print driver being configured to determine that none of the discovered printing devices satisfy the stored printing device accessibility rules, and the apparatus comprising a display configured to display a message indicating that none of the discovered printing devices satisfy the stored printing device accessibility rules in response to the determining.

8. A non-transitory computer readable medium storing a multiple printing device print driver, the multiple printing device print driver, when executed by a controller, causing the controller to control an electronic device to:
provide print access to a plurality of printing devices for the electronic device;
automatically recover printing device accessibility rules from a memory in which the printing device accessibility rules are stored, the printing device accessibility rules providing rules for determining which of the plurality of printing devices the electronic device is allowed to print to using the multiple printing device print driver;
discover one or more of the plurality of printing devices proximal to the electronic device using the network connection and using the multiple printing device print driver to generate a list of the discovered one or more of the plurality of printing devices;
filter the list of the discovered one or more of the plurality of printing devices using the multiple printing device print driver based on the automatically recovered printing device accessibility rules to specify at least one filtered discovered printing device that satisfies the automatically recovered printing device accessibility rules;
send instructions to display the at least one filtered discovered printing device on the electronic device,
the automatically recovered device accessibility rules restricting access to printing devices to which the electronic device is not allowed to print;
determine that none of the discovered one or more of the plurality of printing devices satisfies the automatically recovered printing device accessibility rules; and
display a message indicating that none of the discovered one or more of the plurality of printing devices satisfies the automatically recovered printing device accessibility rules in response to the determining.

9. The non-transitory computer readable medium according to claim 8, the discovering of the one or more of the plurality of printing devices proximal to the electronic device being performed only in response to receiving a print command at the electronic device.

* * * * *